April 7, 1931.  A. A. BÉGIN  1,800,047
BOILER
Filed Jan. 14, 1929   2 Sheets-Sheet 1
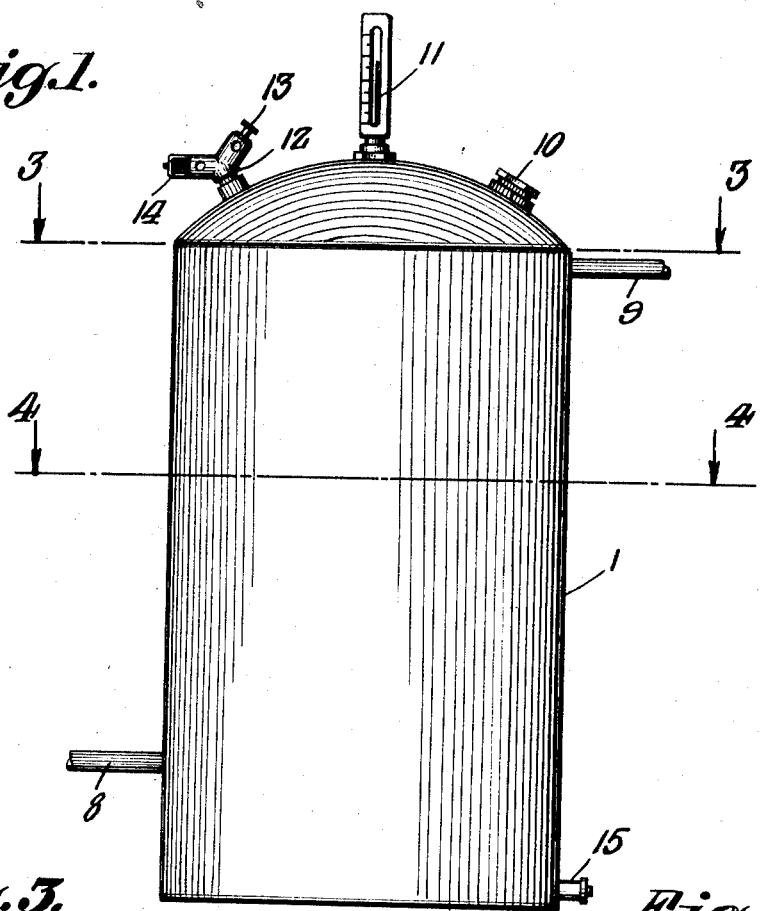
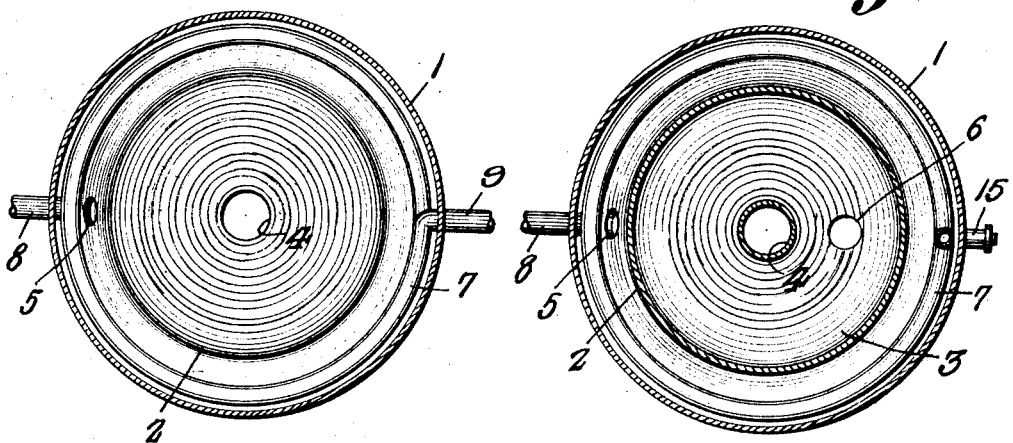
Arthur A. Bégin,
INVENTOR
BY Victor J. Evans
ATTORNEY April 7, 1931.  A. A. BÉGIN  1,800,047
BOILER
Filed Jan. 14, 1929   2 Sheets-Sheet 2
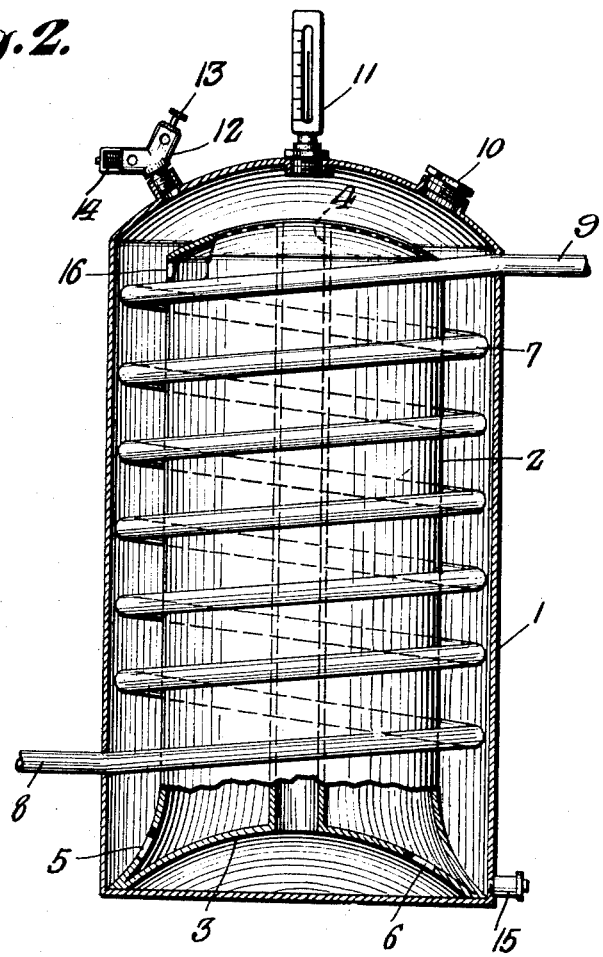
Arthur A. Bégin,
INVENTOR
BY Victor J. Evans
ATTORNEY Patented Apr. 7, 1931

1,800,047

UNITED STATES PATENT OFFICE

ARTHUR A. BÉGIN, OF LISBON FALLS, MAINE

BOILER

Application filed January 14, 1929. Serial No. 332,364.

This invention relates to a boiler for heating the water of a heating system, the general object of the invention being to so construct the boiler that highly heated water and superheated steam can be maintained therein with a minimum amount of fuel; the highly heated water and the superheated steam acting on a water coil in the boiler which is connected to the radiators or other parts of a hot water heating system.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of the improved boiler.

Figure 2 is a vertical sectional view.

Figure 3 is a section on line 3—3 of Figure 1.

Figure 4 is a section on line 4—4 of Figure 1.

Figure 5 is an enlarged sectional view through the needle valve and the safety valve.

In these views, the numeral 1 indicates the outer casing which is formed with a flat bottom which is designed to be placed over suitable heating means, the top of the casing being rounded, as shown. This casing is preferably of cylindrical shape in cross section. An inner casing 2, of much smaller diameter than the first casing, has its bottom flaring so that the end of this inner casing will abut the inner walls of the outer casing at the bottom thereof. This inner casing is formed with a concaved bottom 3 which forms a space between itself and the bottom of the casing 1 and the top of the casing 2 is of convex shape and is spaced from the top of the casing 1.

A tube 4 passes through the center of the inner casing 2, with its ends connected with the bottom and top thereof, as shown. A port 16 is formed in one side of the outer wall of the casing 2, adjacent the upper end thereof for the free circulation of air throughout the boiler. A port 5 is formed in one side wall of the casing 2, adjacent the lower end thereof, so that water placed in the outer casing can enter the inner casing and a port 6 is formed in the bottom of the inner casing adjacent the side which is opposite to the side in which the port 5 is arranged. The water entering the casing 2 will flow therefrom through the port 6 and fill the space between the bottoms of the two casings. Thus but a small amount of water covers the heated bottom of the outer casing so that this water will be quickly turned to steam and this steam will pass upwardly through the tube 4 into the space between the two casings, and from this space the steam will flow through port 5 into the inner casing and back into the bottom space through the port 6 so that the steam will circulate and thus be kept highly heated.

The water coil 7 is placed in the space between the two casings, the inlet of the coil being shown at 8, and its outlet at 9. As will be understood, these portions 8 and 9 are connected with the radiators or other parts of a heating system.

A filling opening, closed by a plug 10, is arranged in the top of the outer casing 1 and a thermometer 11 is fastened to the top of said casing at the center thereof. This thermometer should be capable of registering a maximum temperature of 400° F. A Y-shaped member 12 is threaded in a hole in the top of the casing 1, and one branch of this member contains a needle valve 13 and the other branch contains a safety valve 14.

In starting up the boiler, the needle valve 13 is opened and a certain amount of water is placed in the space between the two casings, after which the plug 10 is closed. Heat is applied at the base of the boiler, as before stated, and when the thermometer registers 212°, steam will escape through the needle valve. Then the needle valve is closed, as the escape of steam will show that there is no air in the boiler. The steam will circulate, as before described, and as it passes over the water coil, the water in said coil will be highly heated. Thus a simple and inexpensive boiler is provided, the maintenance cost of which is very small, as it will require but little heat to produce superheated steam. Of course, the safety valve is provided for preventing the boiler blowing up and a drain 15 is arranged in the lower end of the casing 1 so that the boiler can be drained whenever desired.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A boiler of the class described comprising an inner and outer casing spaced apart, a coil in the space between the two casings, the bottom of the inner casing being concaved to form a water space between itself and the bottom of the outer casing, said inner casing having a port adjacent its lower end whereby water can pass from the space between the two casings into the inner casing and a port in the bottom of the inner casing whereby water can enter the water space from the inner casing and a tube passing vertically through the inner casing for connecting the water space with the space between the two casings.

2. A boiler of the class described comprising an inner and outer casing spaced apart, said inner casing having an opening adjacent its top for permitting air to pass from one casing to the other, the bottom of the inner casing being concaved to form a water space between itself and the bottom of the outer casing, said inner casing having a port adjacent its lower end whereby water can pass from the space between the two casings into the inner casing and a port in the bottom of the inner casing whereby water can enter the water space from the inner casing and a tube passing vertically through the inner casing for connecting the water space with the space between the two casings.

In testimony whereof I affix my signature.

ARTHUR A. BÉGIN.